United States Patent [19]
Studinger

[11] Patent Number: 6,024,342
[45] Date of Patent: Feb. 15, 2000

[54] SUSPENSION SPRING

[76] Inventor: Herman P. Studinger, 21208 Thiele Ct., St. Clair Shores, Mich. 48081

[21] Appl. No.: 09/191,859

[22] Filed: Nov. 12, 1998

Related U.S. Application Data

[60] Provisional application No. 60/065,149, Nov. 12, 1997.

[51] Int. Cl.⁷ .................................................. B60G 11/34
[52] U.S. Cl. ............................................................ 267/26
[58] Field of Search .............................. 267/26, 47, 173, 267/180

[56] References Cited

U.S. PATENT DOCUMENTS 830,810  9/1906  Thomas ..................................... 267/26

FOREIGN PATENT DOCUMENTS 10196  5/1906  Canada .................................... 267/26
3-125039  5/1991  Japan ..................................... 267/158

*Primary Examiner*—Robert J. Oberleitner
*Assistant Examiner*—Mariano Sy
*Attorney, Agent, or Firm*—Lyon, P.C.

[57] ABSTRACT

A suspension spring comprises a plurality of spring elements, each comprising a central portion, a pair of torsional helical coils adjacent thereto, and respective arms coupled to the respective helical coils. A load applied to the central portion of each spring element by a load distributor is reacted by the distal ends of the respective arms, thereby causing flexure of the arms and torsional displacement of the helical coils. The helical coils provide a means for increasing spring compliance and for reducing the stress in the respective arms and central portion of the spring elements, while the plurality of spring elements provides for improved lateral stability in comparison with a single element spring having the same vertical compliance.

12 Claims, 5 Drawing Sheets

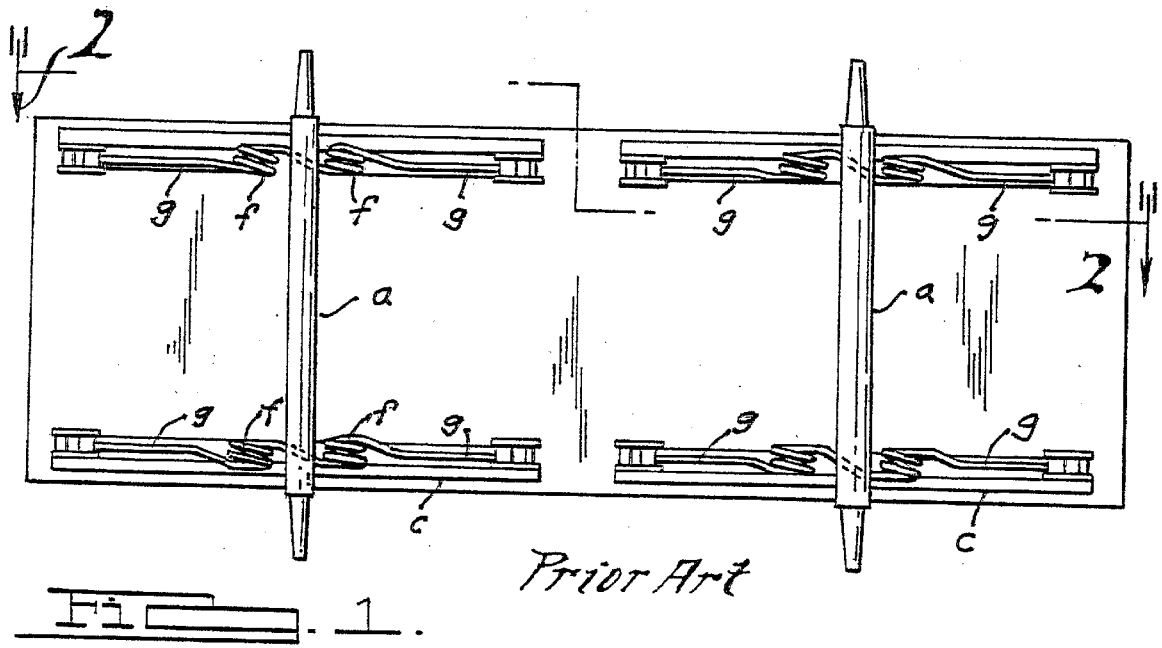
FIG. 1. *Prior Art*
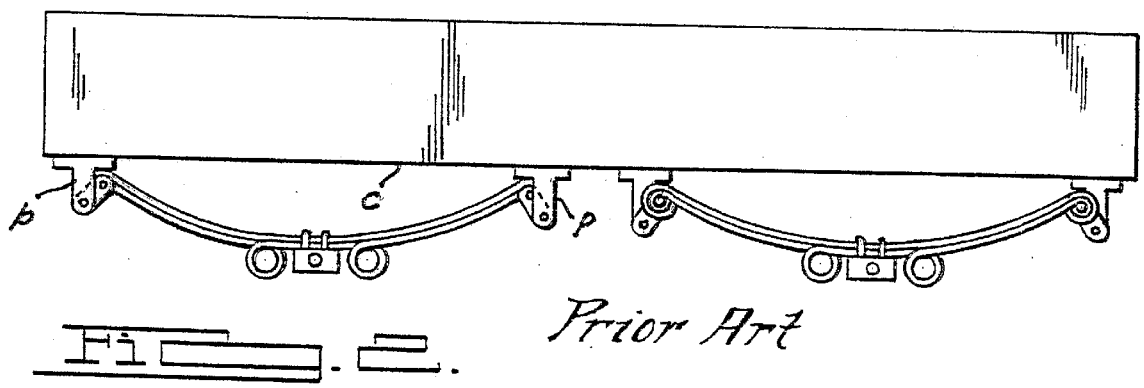
FIG. 2. *Prior Art*
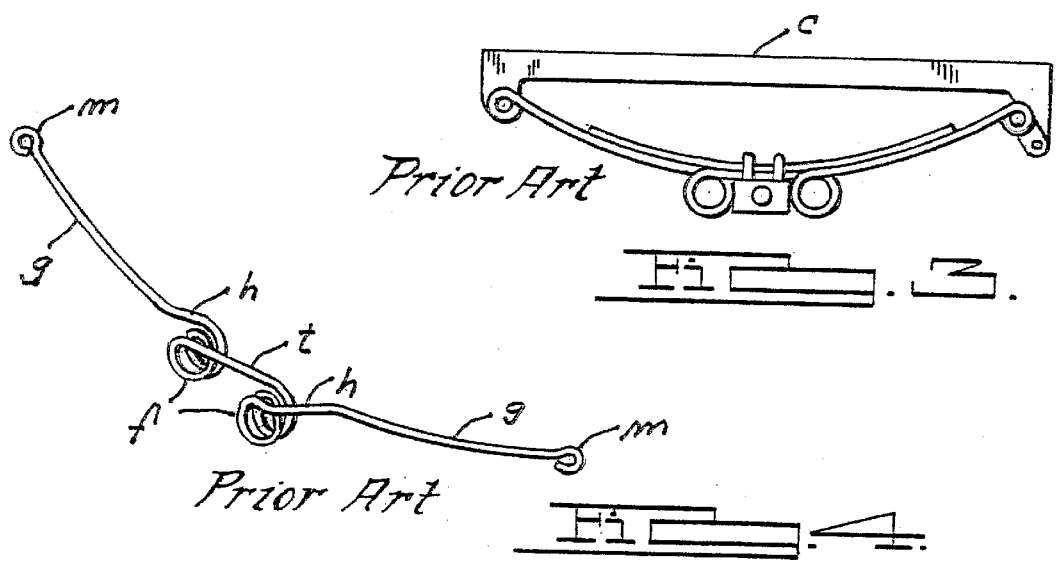
FIG. 3. *Prior Art*
FIG. 4. *Prior Art*

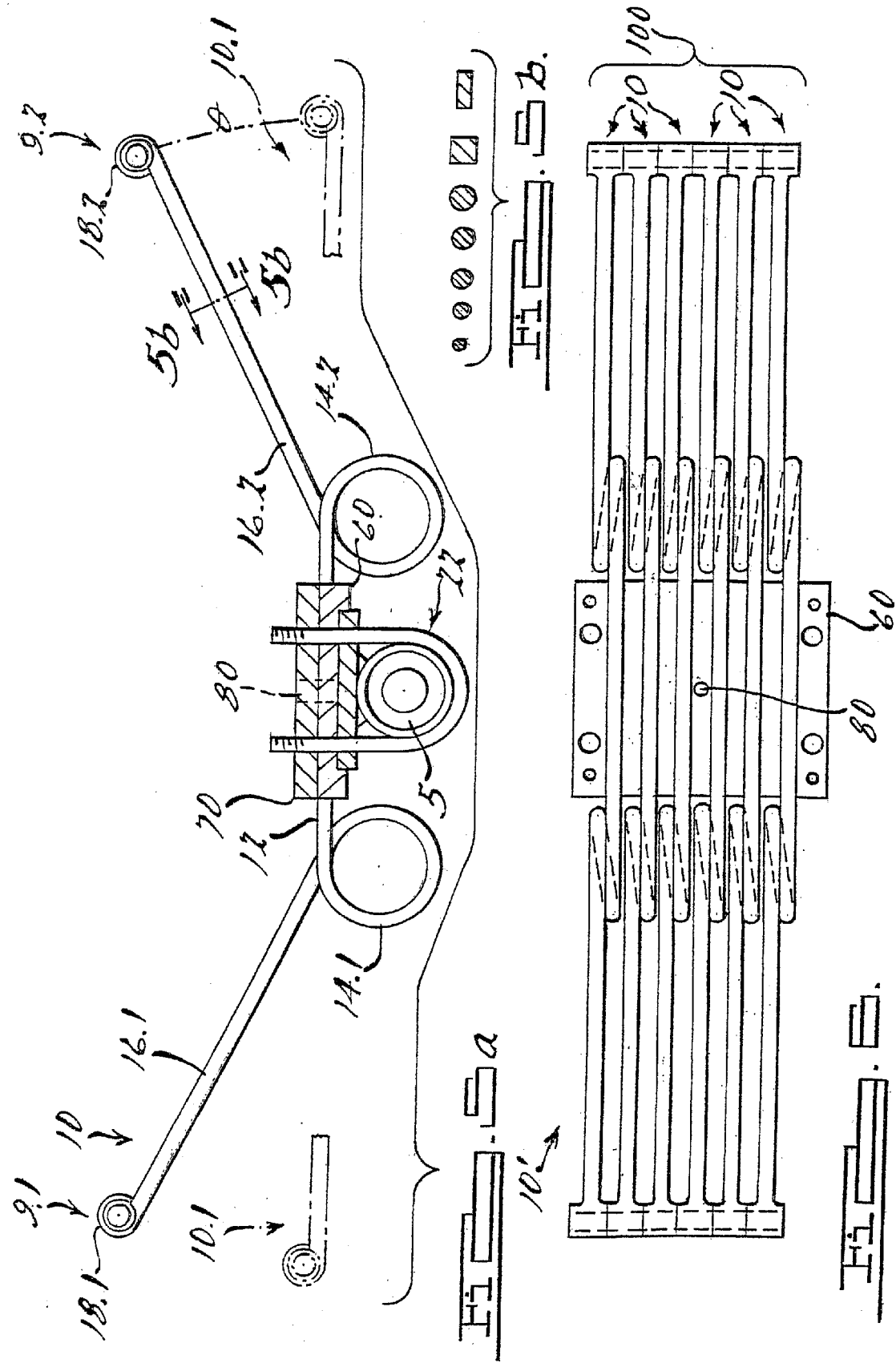

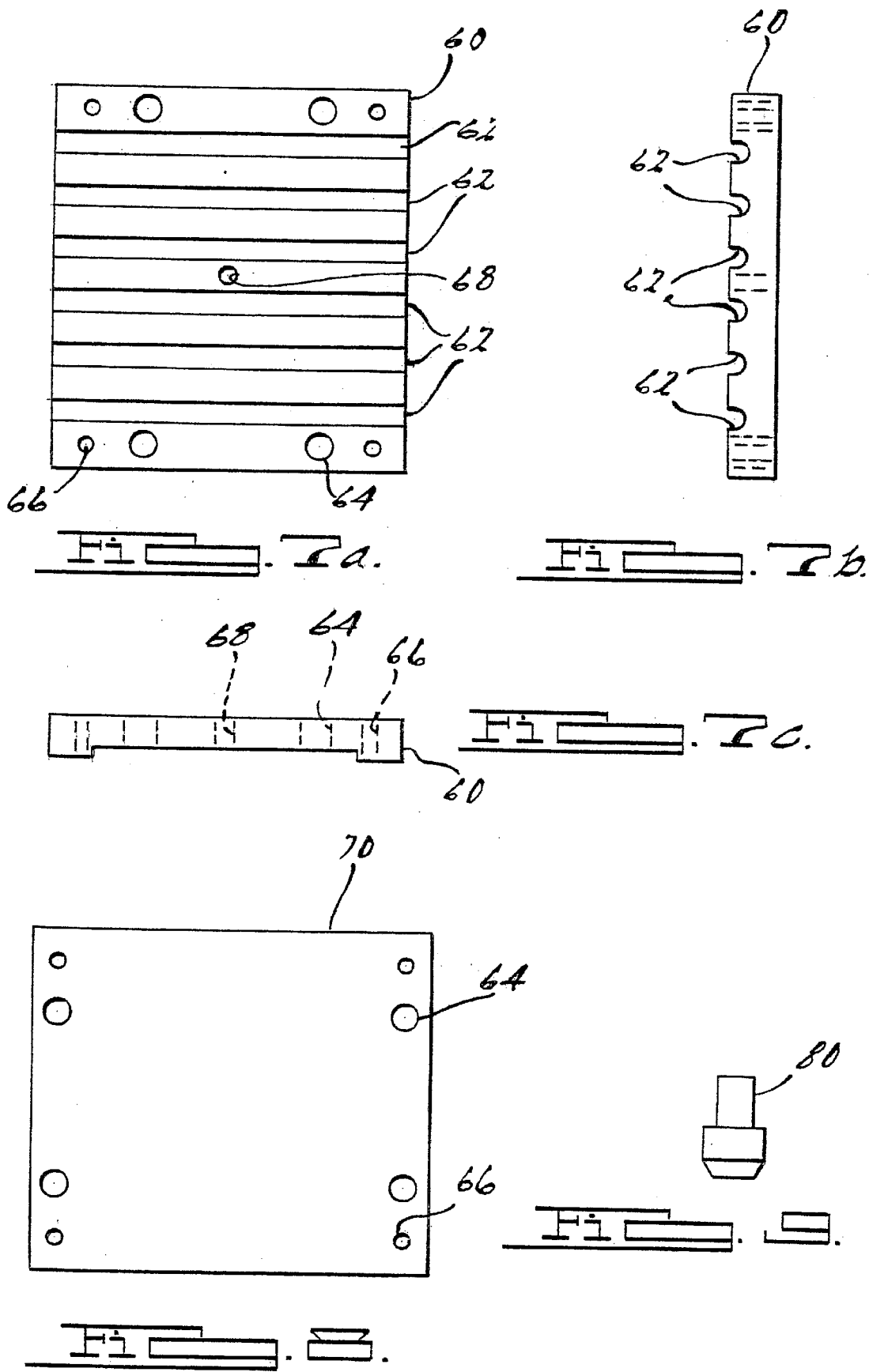

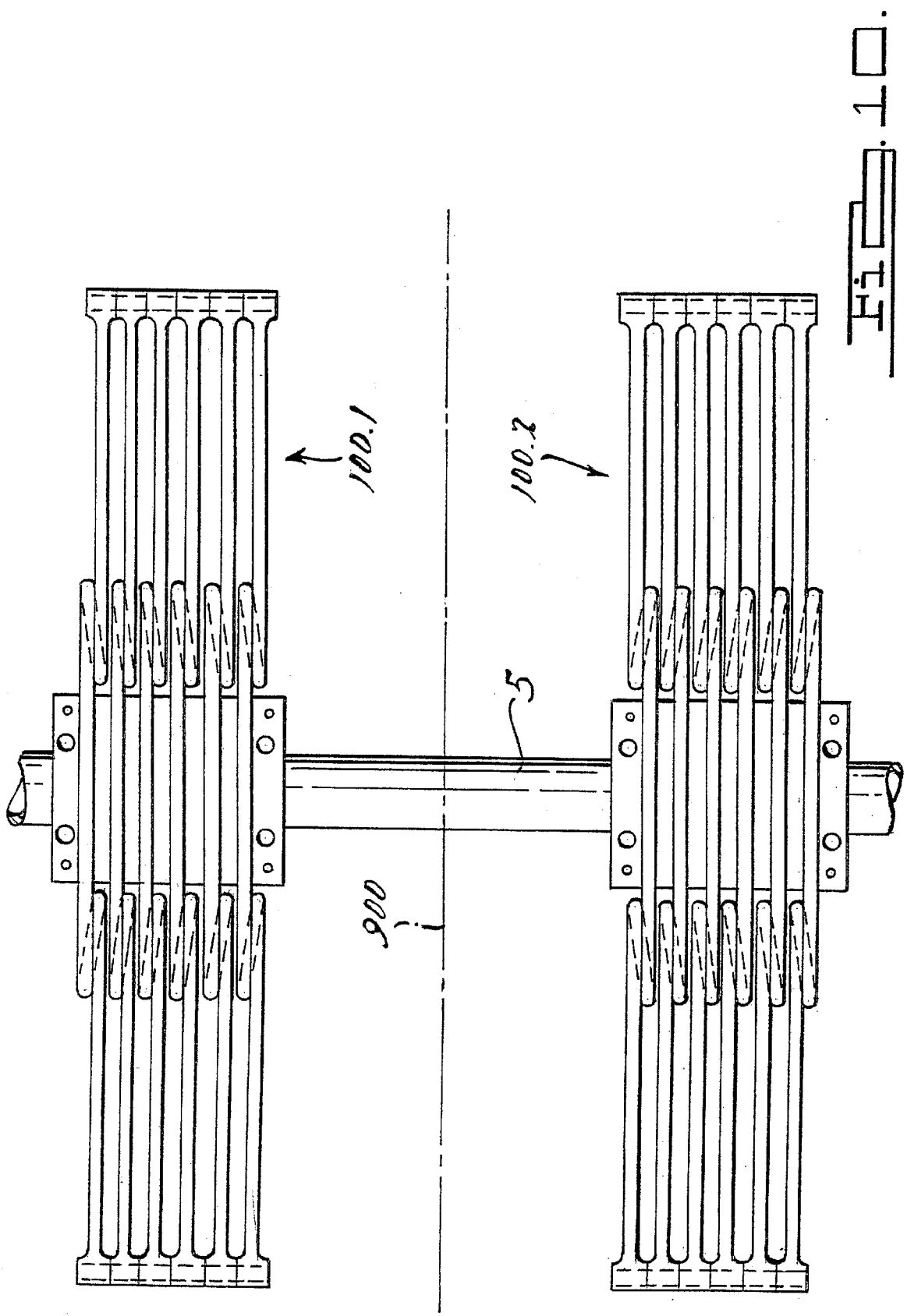

SUSPENSION SPRING

CROSS-REFERENCE TO RELATED APPLICATIONS

The instant application claims the benefit or prior U.S. Provisional Application Ser. No. 60/065,149 filed on Nov. 12, 1997.

TECHNICAL ART

The instant invention generally relates to springs for vehicle suspension systems.

BACKGROUND OF THE INVENTION

The suspension system in a vehicle comprises a plurality of spring/damper assemblies which vibrationally isolate the sprung mass of the vehicle, comprising the passenger carrying frame and body, from the unsprung mass of the vehicle, comprising the associated tire/wheel assemblies, so that the tire/wheel assemblies are free to move in accordance with the contour of the driving surface without imparting the same motion or corresponding forces to the frame and body. The spring/damper assembly comprises the combination of a suspension spring with a damper or shock absorber. The spring absorbs the kinetic energy of vibration imparted to the unsprung mass by the road surface, while the damper dissipates the energy associated with the motion of the unsprung mass relative to the sprung mass.

A variety of types of spring have typically been employed in vehicle suspension systems, including helical coil compression springs, leaf springs, torsion bars, and helical torsion springs. Leaf springs are typically used on non-steering wheels and operate on the principle of bending one or more preformed bars of spring steel. A vehicle suspension leaf spring typically supports the loading of an axle at the center of the spring.

U.S. Pat. No. 830,810, hereafter the No. '801 Patent) incorporated herein by reference, discloses a spring constructed from a single rod that as illustrated in FIGS. 1–4 herein is provided with oppositely turned helical coils f which project downward at the ends of a central portion t, the inner ends of coils f being attached to the central portion t, one coil f in front and the other coil f in rear of an axle a, the outer ends of the coils f attached to spring-arms g, each of which has one initial lateral bend h toward the central longitudinal plane of the axle a, in which plane the spring-arm g extends upward and lengthwise, one spring-arm g extending forward and the other spring-arm g extending rearward, each in accordance with an elliptical curve in the plane. The ends of these arms g are provided with eyes or bearing m that engage shackles p, connected to the body-bar c or to the body directly.

The No. '801 Patent teaches that the oppositely turned coils f are wound with the same helical pitch sense, so that relative to the central portion t of the spring oriented in a longitudinal direction, the fore and aft coils f are disposed on different lateral sides of the spring. This causes the effective width, or overall lateral extent, of the spring to be relatively wide, particularly if the spring-arms g are located within the same plane, which is a disadvantage for packaging the spring within the vehicle suspension. Moreover, this requires lateral bends in the spring to minimize the effective width of the spring which causes the spring to be weaker and more difficult to manufacture.

SUMMARY OF THE INVENTION

The instant invention overcomes the above-noted problems by providing a spring constructed from a rod or bar of arbitrary cross-section formed so as to incorporate a central portion bounded by two helical coils, each of opposite helical pitch sense, the helical coils connected to respective arms which are terminated at attachments. In operation, the spring is disposed so that a loading attached to the central portion preferably moves parallel to a plane of motion nominally containing the central portion and the attachments, whereby as the loading moves within the plane of motion, the associated helical coils are either wound or unwound depending upon the direction of movement. The helical coils thereby act as helical torsion springs. By incorporating opposite helical pitch senses, the helical coils are disposed on the same side of the plane of motion whereby the central portion and arms can be constructed of straight sections disposed parallel to one another so as to provide for a compact arrangement which is relatively easy to manufacture. Furthermore, in accordance with the instant invention, individual spring elements may be assembled in a compact package to provide for improved spring with improved lateral stiffness and better ride quality in comparison with a single spring having similar compliance to that of the assembly, whereby the opposite pitch senses of the helical coils facilitate compact packaging of the spring assembly.

Accordingly, one object of the instant invention is to provide an improved suspension spring that can be more easily manufactured.

A further object of the instant invention is to provide an improved suspension spring with improved lateral stability.

A further object of the instant invention is to provide an improved suspension spring with improved ride characteristics.

A yet further object of the instant invention is to provide an improved suspension spring that is more durable.

A yet further object of the instant invention is to provide an improved suspension spring that in plurality can be incorporated in a relatively compact assembly.

In accordance with these objectives, one feature of the instant invention is that the spring is formed as a pair of helical coils, each adjacent both a common central portion and independent arms.

Another feature of the instant invention is that the action of the spring results from a loading applied between the central portion and the ends of the independent arms.

Yet another feature of the instant invention is that the helical coils incorporate opposite helical pitch senses.

Yet another feature of the instant invention is that a plurality of spring elements are assembled in a spring assembly.

Yet another feature of the instant invention is a load distributor for distributing forces to the central portions of each of the spring elements in the spring assembly.

Yet another feature of the instant invention is the incorporation of a means in the load distributor for restraining deformation of the central portions of each of the spring elements.

The specific features of the instant invention provide a number of associated advantages. One advantage of the instant invention with respect to the prior art is that with the helical pitch senses of the helical coils being opposite one another, the spring is easier to manufacture.

Another advantage of the instant invention is that with the helical pitch senses of the helical coils being opposite one another, the spring is more durable.

Yet another advantage of the instant invention is that with the helical pitch sense of the helical coils being opposite one another, a plurality spring may be assembled more compactly.

Yet another advantage of the instant invention is that with a plurality of spring elements forming a spring assembly, the lateral stiffness of the spring assembly is greater than would result from a single spring element with similar vertical compliance characteristics.

Yet another advantage of the instant invention is that with the incorporation of helical coils, stresses in the adjacent arms are less than would be present in a corresponding leaf spring.

Accordingly, the instant invention provides for an improved suspension spring having improved ride characteristics, which is easier to manufacture, and which is more durable.

These and other objects, features, and advantages of the instant invention will be more fully understood after reading the following detailed description of the preferred embodiment with reference to the accompanying drawings and viewed in accordance with the appended claims. While this description will illustrate the application of the instant invention in a vehicle suspension system, it will be understood by one with ordinary skill in that art that the instant invention can also be applied to any system incorporating a leaf spring.

BRIEF DESCRIPTION OF THE DRAWINGS

FIG. 1 illustrates a plan view of an environment of a prior art suspension spring.

FIG. 2 illustrates a side view of an environment of a prior art suspension spring.

FIG. 3 illustrates an alternate environment of a prior art suspension spring.

FIG. 4 illustrates a prior art suspension spring.

FIG. 5a illustrates one embodiment of the instant invention.

FIG. 5b illustrates various cross-sections of the instant invention.

FIG. 6 illustrates another embodiment of the instant invention comprising a plurality of elements.

FIGS. 7a, 7b, and 7c illustrate a first attachment plate that is part of a load distributor incorporated in the embodiment of FIG. 6.

FIG. 8 illustrates a second attachment plate that is part of a load distributor incorporated in the embodiment of FIG. 6.

FIG. 9 illustrates a pin incorporated in the embodiment of FIG. 6.

FIG. 10 illustrates the instant invention as part of a suspension system.

DETAILED DESCRIPTION OF THE PREFERRED EMBODIMENT(S)

Figure 11:
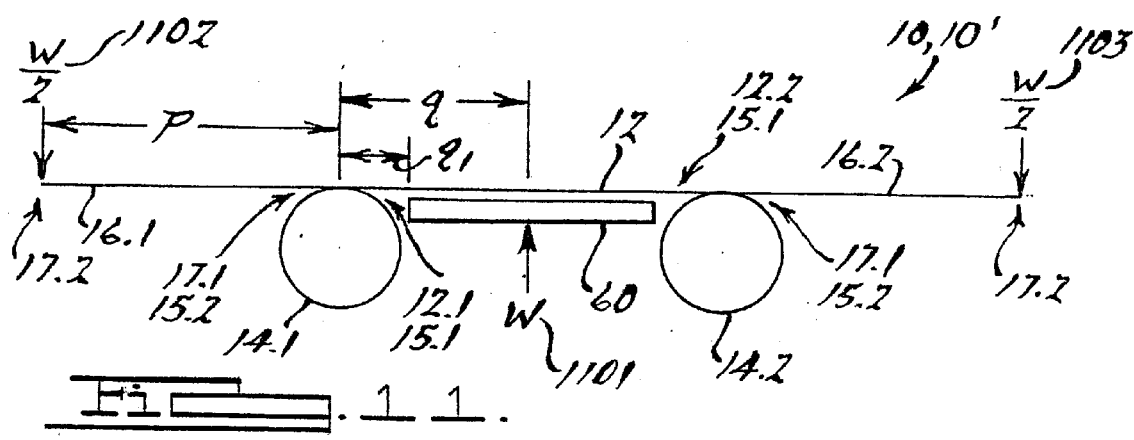
FIG. 11 illustrates a free-body diagram of a spring element.

Referring to FIG. 5a, a suspension spring 10 is formed from a rod or bar preferably consisting of an elastic material such as for example spring steel. The rod contains a central portion 12 that is bounded by two helical coils, 14.1 and 14.2, which respectively extend into arms 16.1 and 16.2 that are terminated by attachments 18.1 and 18.2. The cross-section of the rod may be of an arbitrary shape, and the cross-sectional shape may vary with location on the spring. Various typical cross-sections for springs of various compliance values are illustrated in FIG. 5b, whereby the compliance of the spring decreases with increasing section modulus. A square or rectangular cross-section provides for increased energy storage. A loading element 5, such as an axle assembly 5, is attached to the central portion 12 with attachment plates 60 and 70 for example using U-bolts 22. A loading from the loading element 5 in a direction 7 projected towards the attachment 18.1 and 18.2 causes the helical coils 14.1 and 14.2 to be twisted further in the direction of the respective helical pitch senses until the reaction forces 9.1 and 9.2 balance the applied loading, resulting in a deformation 10.1 of the suspension spring 10. The motion of the suspension spring 10 nominally occurs within a plane of deformation 30 that contains the attachments 18.1, 18.2 and the central portion 12. The attachments 18.1, 18.2 are preferably adapted for pivotal attachment to either a frame or to a shackle that is pivotally attached to a frame, whereby the shackle provides for changes in the distance between attachments 18.1, 18.2 responsive to the vertical deformation of the suspension spring 10.

Referring to FIGS. 6–9 and 5a, a plurality of spring elements 10 are assembled in a spring assembly 100 by attachment plates 60 and 70, clamped together with fasteners through holes 66. Spring elements 10 are aligned relative to attachment plate 60 by slots 62, and a pin 80 that engages hole 68 and locates the spring assembly 100 relative to axle assembly 5. The axle assembly 5 is secured to the spring assembly 100 with U-bolts 22 through holes 64.

The suspension spring 10 or spring assembly 100 are secured to the frame of a vehicle or trailer using apparatus and methods known to one of ordinary skill in the art, for example as illustrated in FIGS. 1–3.

Referring to FIG. 10, a plurality of spring assemblies 100.1 and 100.2 are used to suspend a vehicle or trailer above an axle assembly 5, whereby in a preferred mode, the elements of spring assembly 100.1 are symmetric to the elements of spring assembly 100.2 relative to a longitudinal axis 900.

Figure 12:
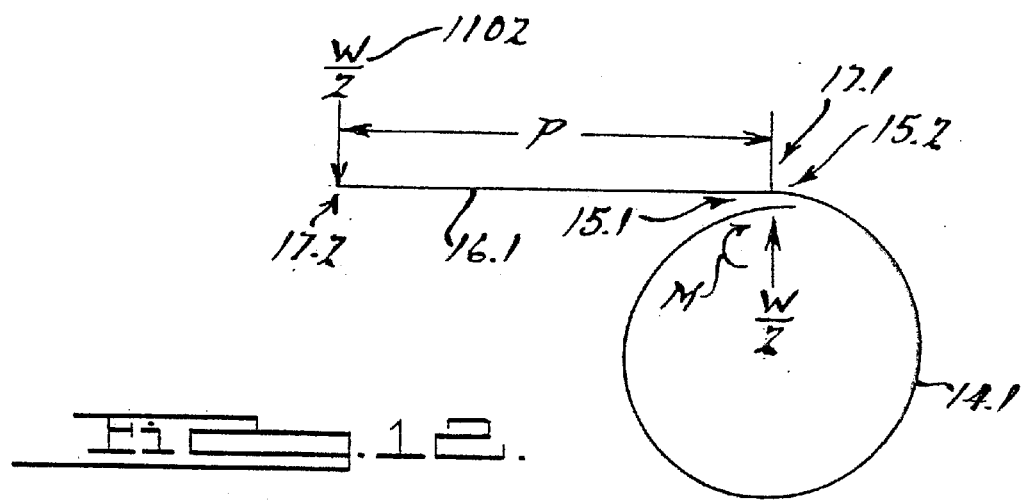
FIG. 12 illustrates a free-body diagram of a portion of the spring element.
Figure 13:
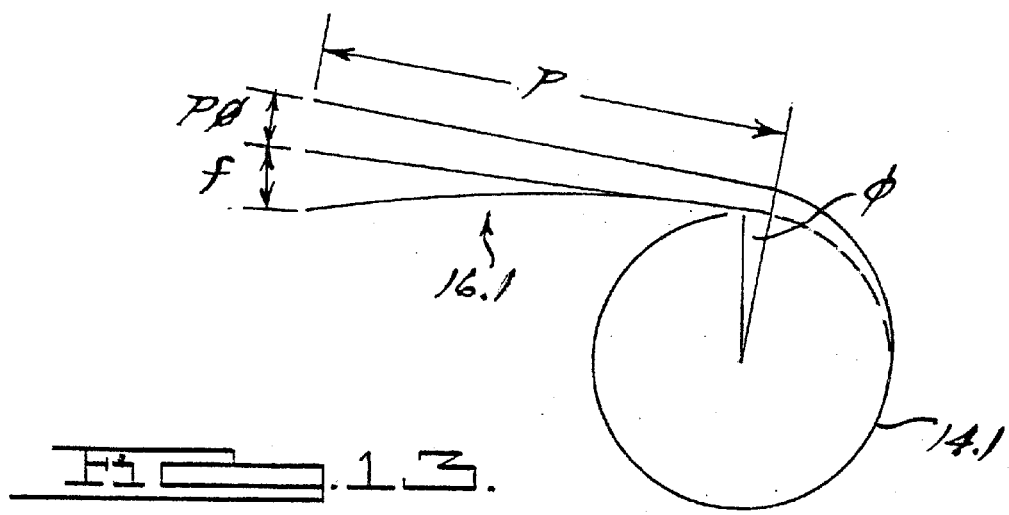
FIG. 13 illustrates the components of displacement associated with the portion of the spring element.

The instant invention will be more fully understood from the following approximate analysis, with reference to FIGS. 11–13.

Referring to FIG. 11, a spring element 10 comprises a central portion 12 having a first end 12.1 and a second end 12.2; first and second arms 16.1, 16.2, each having a first end 17.1 and a second end 17.2; and first and second helical coils 14.1, 14.2, each having a first end 15.1 and a second end 15.2. The first end 15.1 of said first helical coil 14.1 is coupled to the first end 12.1 of the central portion 12 and the second end 15.2 of said first helical coil 14.1 is coupled to the first end 17.1 of the first arm 16.1. Furthermore, the first end 15.1 of the second helical coil 14.2 is coupled to the second end 12.2 of the central portion 12, and the second end 15.2 of the second helical coil 14.2 is coupled to the first end 17.1 of the second arm 16.2. A plurality of spring elements 10 are generally combined to form a spring assembly 100 that constitutes a suspension spring 10'. A load distributor 60 distributes a first force 1101, equal to the load W, amongst each of said central portions 12 of the plurality of spring elements 10, wherein each second end 17.2 of the first arm 16.1 is adapted to receive a second force 1102 and each second end 17.2 of said second arm 16.2 is adapted to receive a third force 1103, whereby the second and third forces 1102, 1103 are reactive to the first force 1101 and the plurality of spring elements act in unison responsive to the first, second and third forces, 1101, 1102, 1103. As illustrated in FIG. 11, the first force 1101 equal to the load W is generally applied midway between the second and third forces 1102, 1103, whereby the second and third forces 1102, 1103 are then each equal in value to half of the load W. Generally the first force 1101 results from the reaction of the unsprung mass since the load distributor 60 is operatively connected to the axle assembly 5 of the corresponding suspension system, and the second and third forces 1102, 1103 result from the reaction of the sprung mass since the second ends 17.2 of the first and second arm 16.1, 16.2 are operatively connected to the mass suspended by the suspension system.

FIG. 12 illustrates a free body diagram of the first arm 16.1 and first helical coil 14.1, wherein responsive to the second force 1102 of W/2 reacting downwardly at the second end 17.2 of the first arm 16.1, equilibrium is maintained by an upward force of W/2 and a moment M at the first end 15.1 of the first helical coil 14.1

Considering the first arm 16.1 as an end-loaded cantilevered beam, the maximum moment M occurs at the first end 17.1 of the first arm 16.1 and is given by $$M_{MAX} = \frac{W}{2} \cdot p \qquad (1)$$

where p is the length of the first arm 16.1 between the first end 17.1 thereof and the point at which the second force 1102 is applied.

The corresponding displacement of the first arm as a result of bending is given by:

$$f = \frac{\frac{W}{2} \cdot p^3}{3 \cdot E \cdot I} = \frac{M_{MAX}}{E \cdot I} \cdot \frac{p^2}{3} \qquad (2)$$

where E is the modulus of elasticity and I is the moment of inertia of the first arm 16.1, assuming that the fist arm 16.1 is of uniform cross-section. For a uniform cross-section of section modulus I/c, the maximum fiber stress occurs at the first end 17.1 and is given by:

$$\sigma_{MAX} = \frac{M_{MAX}}{\frac{I}{c}} \qquad (3)$$

The first helical coil 14.1 acts as a helical torsion spring. The moment therein is given by:

$$M = M_{MAX} \qquad (4)$$

If the first helical coil 14.1 is of uniform cross-section equal to that of the first arm 16.1 at the first end 17.1, then the maximum fiber stress within the first helical coil is given from equations (3) and (4) as:

$$\sigma = \sigma_{MAX} \qquad (5)$$

Accordingly, for a design based upon flexure, the section modulus of the first helical coil 16.1 and the first arm 16.1 at the first end 17.1 must be at least:

$$\frac{I}{c} = \frac{M_{MAX}}{\sigma_{MAX}} \qquad (6)$$

The angular displacement $\phi$ of the first helical coil resulting from the moment of equation (4) is given by:

$$\phi = \frac{M \cdot (\pi \cdot N \cdot D)}{E \cdot I} = \frac{M_{MAX}}{E \cdot I} \cdot \pi \cdot N \cdot D \qquad (7)$$

Referring to FIG. 13, assuming that the deformation of the central portion 12 of the spring element 10 is restrained by the load distributor 60, then the total displacement of the spring element 10 is given by the combination of the displacement f due to bending of the first arm 16.1 and the displacement p·$\phi$ resulting from the rotation of the first arm 16.1 of length p by the torsional deformation angle $\phi$ of the first helical coil 14.1, using a small angle approximation. Since these displacements result from a load of W/2, the corresponding spring constant of the spring element 10 is given by:

$$K = \frac{\frac{W}{2}}{f + p \cdot \phi} = \frac{\frac{W}{2}}{\frac{M_{MAX}}{E \cdot I} \cdot \left(\frac{p^2}{3} + \pi \cdot N \cdot D\right)} = \frac{E \cdot I}{p \cdot \left(\frac{p^2}{3} + \pi \cdot N \cdot D\right)} \qquad (8)$$

where D is the diameter of the first helical coil 14.1 and N is the corresponding number of turns (typically N=1).

The above equations illustrate several of the properties and advantages of the invention. From equation (8), the spring constant of the spring element can be controlled by the geometry of the helical coil 14.1, 14.2 independent of the properties of the arm 16.1, 16.2. More particularly, the presence of the helical coils 14.1, 14.2 reduces the spring constant and thereby softens the spring, which can improve ride.

Further, the arms 16.1, 16.2 and central portion 12 of the spring are individually substantially shorter than the overall length of the spring, and accordingly can be made with smaller section modulus than would be required of a continuous simply supported beam element as incorporated in prior-art leaf spring designs, for which the maximum moment over the same span and subject to the same load is given by:

$$M_{MAX} = \frac{W}{2} \cdot \left(p + \frac{q}{2}\right) \qquad (9)$$

Yet further, by adapting the load distributor 60 so as to restrain deformations in the central portion 12, and by positioning the first helical coil 16.1 midway between the second end 17.2 of the first arm 16.1 and the edge of the load distributor 60 that is proximate the first helical coil 14.1, or equivalently, by making the lengths p and $q_1$ equal, then the maximum flexure moment at the first end 17.1 of the first arm 16.1 and the first end 15.1 of the central portion 12 can be minimized, thereby enabling these elements to be constructed with a relatively small section modulus I/c.

Yet further, by combining a plurality of spring elements 10 so as to form a spring assembly 100, 10', the lateral stiffness of the spring assembly 100, 10' is greater than would be provided by an individual spring of the same vertical compliance K because of the relatively large lateral section modulus of the spring assembly 100, 10'.

One of ordinary skill in the art will appreciate that the efficiency of the spring elements 10 can be improved by tapering the arms so as to provide uniform strength throughout.

One of ordinary skill in the art will appreciate that the instant invention can be incorporated into any kind of suspension systems, for example in either self-propelled vehicles or trailers.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A suspension spring, comprising:
   a. a plurality of spring elements, each said spring element of said plurality of spring elements comprising:
      i). a central portion having a first end and a second end;
      ii). first and second arms, each said first and second arm having a first end and a second end; and
      iii). first and second helical coils, each said first and second helical coil having a first end and a second end, wherein said first end of said first helical coil is coupled to said first end of said central portion, said second end of said first helical coil is coupled to said first end of said first arm, said first end of said second helical coil is coupled to said second end of said central portion, and said second end of said second helical coil is coupled to said first end of said second arm; and
   b. a load distributor for distributing a first force amongst each of said central portions of said plurality of spring elements, wherein said load distributor comprises at least one attachment plate, said at least one attachment plate comprises a plurality of slots substantially parallel to one another, each said central portion of said plurality of spring elements is disposed within a distinct one of said plurality of slots, said plurality of slots is disposed so that each of said plurality of spring elements are proximate to another of said plurality of spring elements, each said second end of said first arm is adapted to receive a second force and each said second end of said second arm of said plurality of spring elements is adapted to receive a third force, and each of the elements of said plurality of spring elements are disposed substantially parallel to a plane of reference and displaced from one another so as to provide for increased stiffness in a direction that is normal to said plane of reference, whereby said second and third forces are reactive to said first force and said plurality of spring elements act in unison responsive to said first, second and third forces.

2. A suspension spring as recited in claim 1, wherein each said spring element comprises a continuous elastic material.

3. A suspension spring as recited in claim 1, whereby said suspension spring is coupled between a sprung mass and an unsprung mass, said first force is applied to said unsprung mass and said second and third forces are applied to said sprung mass.

4. A suspension spring as recited in claim 1, wherein said second end of said first arm comprises a pivotal attachment.

5. A suspension spring as recited in claim 4, wherein said second end of said second arm comprises a pivotal attachment.

6. A suspension spring as recited in claim 1, wherein said first and second helical coils have opposite helical pitch senses.

7. A suspension spring as recited in claim 1, wherein said load distributor extends along a substantial portion of said central portion.

8. A suspension spring as recited in claim 1, wherein said load distributor is adapted to restrict the deformation of said central portion.

9. A suspension spring as recited in claim 1, wherein said first helical coil is located substantially midway between the edge of said load distributor that is proximate said first helical coil and the point at which said second force is applied to said second end of said second arm.

10. A suspension spring as recited in claim 1, wherein said first helical coil is proximate the edge of said load distributor that is proximate said first helical coil.

11. A suspension system comprising:
   a. a first plurality of spring elements, each said spring element of said first plurality of spring elements comprising:
      i). a central portion having a first end and a second end;
      ii). first and second arms, each said first and second arm having a first end and a second end; and
      iii). first and second helical coils, each said first and second helical coil having a first end and a second end, wherein said first end of said first helical coil is coupled to said first end of said central portion, said second end of said first helical coil is coupled to said first end of said first arm, said first end of said second helical coil is coupled to said second end of said central portion, and said second end of said second helical coil is coupled to said first end of said second arm;
   b. a first load distributor for distributing a first force amongst each of said central portions of said first plurality of spring elements, wherein said first load distributor comprises at least one first attachment plate, said at least one first attachment plate comprises a first plurality of slots substantially parallel to one another, each said central portion of said first plurality of spring elements is disposed within a distinct one of said first plurality of slots, said first plurality of slots is disposed so that each of said first plurality of spring elements are proximate to another of said first plurality of spring elements, each said second end of said first arm of said first plurality of spring elements is adapted to receive a second force and each said second end of said second arm of said first plurality of spring elements is adapted to receive a third force, and each of the elements of said first plurality of spring elements are disposed substantially parallel to a first plane of reference and displaced from one another so as to provide for increased stiffness in a direction that is normal to said first plane of reference, whereby said second and third forces are reactive to said first force and said first plurality of spring elements act in unison responsive to said first, second and third forces;
   c. a second plurality of spring elements, each said spring element of said second plurality of spring elements comprising:
      i). a central portion having a first end and a second end;
      ii). first and second arms, each said first and second arm having a first end and a second end; and
      iii). first and second helical coils, each said first and second helical coil having a first end and a second end, wherein said first end of said first helical coil is coupled to said first end of said central portion, said second end of said first helical coil is coupled to said first end of said first arm, said first end of said second helical coil is coupled to said second end of said central portion, and said second end of said second helical coil is coupled to said first end of said second arm; and d. a second load distributor for distributing a fourth force amongst each of said central portions of said second plurality of spring elements, wherein said second load distributor comprises at least one second attachment plate, said at least one second attachment plate comprises a second plurality of slots substantially parallel to one another, each said central portion of said second plurality of spring elements is disposed within a distinct one of said second plurality of slots, said second plurality of slots is disposed so that each of said second plurality of spring elements are proximate to another of said second plurality of spring elements, each said second end of said first arm of said second plurality of spring elements is adapted to receive a fifth force and each said second end of said second arm of said second plurality of spring elements is adapted to receive a sixth force, and each of the elements of said second plurality of spring elements are disposed substantially parallel to a second plane of reference and displaced from one another so as to provide for increased stiffness in a direction that is normal to said second plane of reference, whereby said fifth and sixth forces are reactive to said fourth force and said second plurality of spring elements act in unison responsive to said fourth, fifth and sixth forces.

12. A suspension spring as recited in claim 1, wherein said load distributor comprises a plurality of attachment plates, wherein each said central portion of said plurality of spring elements is disposed between two of said plurality of attachment plates.

* * * * *